US009210423B2

(12) United States Patent
Ugur et al.

(10) Patent No.: US 9,210,423 B2
(45) Date of Patent: Dec. 8, 2015

(54) METHOD FOR CODING AND AN APPARATUS

(71) Applicant: Nokia Technologies Oy, Espoo (FI)

(72) Inventors: Kemal Ugur, Istanbul (TR); Jani Lainema, Tampere (FI)

(73) Assignee: Nokia Technologies Oy, Espoo (FI)

( * ) Notice: Subject to any disclaimer, the term of this patent is extended or adjusted under 35 U.S.C. 154(b) by 91 days.

(21) Appl. No.: 13/760,694

(22) Filed: Feb. 6, 2013

(65) Prior Publication Data

US 2013/0202052 A1    Aug. 8, 2013

Related U.S. Application Data

(60) Provisional application No. 61/595,648, filed on Feb. 6, 2012.

(51) Int. Cl.
*H04N 7/26* (2006.01)
*H04N 19/46* (2014.01)

(52) U.S. Cl.
CPC ......... *H04N 19/00545* (2013.01); *H04N 19/46* (2014.11)

(58) Field of Classification Search
CPC ... H04N 19/00545; H04N 19/46; H04N 7/26; H04N 11/04
USPC ............................ 375/240.2, 240.03, 240.6
See application file for complete search history.

(56) References Cited

U.S. PATENT DOCUMENTS

| 6,647,061 | B1 * | 11/2003 | Panusopone ... | H04N 21/234309 |
| | | | | 375/240.12 |
| 8,351,502 | B2 * | 1/2013 | Lee ........................ | H04N 19/70 |
| | | | | 375/240.12 |
| 8,687,709 | B2 * | 4/2014 | Hsu ........................ | H04N 19/52 |
| | | | | 375/240.12 |
| 2002/0141502 | A1 * | 10/2002 | Lin et al. ................... | 375/240.27 |
| 2004/0057521 | A1 * | 3/2004 | Brown ................. | H04N 19/176 |
| | | | | 375/240.25 |
| 2006/0153294 | A1 * | 7/2006 | Wang ................... | H04N 19/197 |
| | | | | 375/240.08 |
| 2007/0036223 | A1 | 2/2007 | Srinivasan | |

(Continued)

FOREIGN PATENT DOCUMENTS

| KR | 2007-0038695 A | 4/2007 |
| KR | 2008-0042809 A | 5/2008 |

OTHER PUBLICATIONS

International Search Report for Application No. PCT/FI2013/050124, dated May 23, 2013.

(Continued)

*Primary Examiner* — Curtis A Alia
*Assistant Examiner* — Emmanuel Maglo
(74) *Attorney, Agent, or Firm* — Alston & Bird LLP (57) ABSTRACT

There is disclosed a method comprising receiving a set of coefficients; and determining whether a sign of a coefficient in the set of coefficients can be embedded in a bitstream. If the determining indicates that the sign of the coefficient in the set of coefficients can be embedded in the bitstream, an indication of the embedded sign is inserted into the bitstream. There is also disclosed a method comprising receiving a set of decoded coefficients; and determining whether a bitstream contains an indication of an embedded sign of a coefficient. If the determining indicates that the bitstream contains the indication of an embedded sign of a coefficient, the sign is determined on the basis of the decoded coefficients; and the sign of the coefficient is modified on the basis of the determined sign.

18 Claims, 7 Drawing Sheets

(56) References Cited

U.S. PATENT DOCUMENTS

| | | | |
|---|---|---|---|
| 2007/0098283 A1* | 5/2007 | Kim et al. | 382/239 |
| 2012/0183052 A1* | 7/2012 | Lou et al. | 375/240.03 |
| 2012/0207222 A1* | 8/2012 | Lou et al. | 375/240.18 |
| 2012/0230396 A1* | 9/2012 | Cohen et al. | 375/240.03 |
| 2013/0114678 A1* | 5/2013 | Baylon et al. | 375/240.02 |
| 2013/0177067 A1* | 7/2013 | Minoo et al. | 375/240.02 |
| 2013/0177068 A1* | 7/2013 | Minoo et al. | 375/240.02 |
| 2013/0188688 A1* | 7/2013 | Panusopone et al. | 375/240.02 |
| 2013/0188741 A1* | 7/2013 | Minoo et al. | 375/240.26 |
| 2013/0202026 A1* | 8/2013 | Fang et al. | 375/240.02 |

OTHER PUBLICATIONS

Sole, J., et al., *Transform Coefficient Coding in HEVC* IEEE Trans. on Circuits and Systems on Video Technology, vol. 22, No. 12, (2012) pp. 1765-1777.

Wang, J., et al., *Multiple Sign Bits Hiding for High Efficiency Video Coding*, proc. IEEE conf. on Visual Communications and Image Processing (2012) 6 pages.

Written Opinion for International Application No. PCT/FI2013/050124, dated May 23, 2013.

Extended European Search Report for corresponding European Application No. 13747011.8 dated Sep. 2, 2015, 8 pages.

Clare, G. et al., *Sign Data Hiding*, MPEG $7^{th}$ Meeting, Joint Collaborative Team on Video Coding (JCT-VC) of ITU-T SG16 WP3 and ISO/IEC JTC1/SC29/WG11, m21833 (Nov. 2011) 1-9.

Clare, G. et al., *CE11:Sign Data Hiding*, MPEG $8^{th}$ Meeting, Joint Collaborative Team on Video Coding (JCT-VC) of ITU-T SG16 WP3 and ISO/IEC JTC1/SC29/WG11, m23097 (Feb. 2012) 1-10.

Gao, W. et al., *AHGI9: A lossless coding solution for HEVC*, MPEG $8^{th}$ Meeting, Joint Collaborative Team on Video Coding (JCT-VC) of ITU-T SG16 WP3 and ISO/IEC JTC1/SC29/WG11, M23411 (Feb. 2012) 1-3.

Yu, X. et al., *Multiple Sign Bits Hiding*, MPEG $8^{th}$ Meeting, Joint Collaborative Team on Video Coding (JCT-VC) of ITU-T SG16 WP3 and ISO/IEC JTC1/SC29/WG11, (Feb. 2012) 1-5.

Office Action from corresponding Korean Patent Application No. 10-2014-7025003 dated Sep. 25, 2015.

* cited by examiner

METHOD FOR CODING AND AN APPARATUS

TECHNICAL FIELD

There is provided a method for encoding, a method for decoding, an apparatus, computer program products, an encoder and a decoder.

BACKGROUND INFORMATION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section A video codec may comprise an encoder which transforms input video into a compressed representation suitable for storage and/or transmission and a decoder that can uncompress the compressed video representation back into a viewable form, or either one of them. The encoder may discard some information in the original video sequence in order to represent the video in a more compact form, for example at a lower bit rate.

Many hybrid video codecs, operating for example according to the International Telecommunication Union's ITU-T H.263 and H.264 coding standards, encode video information in two phases. In the first phase, pixel values in a certain picture area or "block" are predicted. These pixel values can be predicted, for example, by motion compensation mechanisms, which involve finding and indicating an area in one of the previously encoded video frames (or a later coded video frame) that corresponds closely to the block being coded. Additionally, pixel values can be predicted by spatial mechanisms which involve finding and indicating a spatial region relationship, for example by using pixel values around the block to be coded in a specified manner.

Prediction approaches using image information from a previous (or a later) image can also be called as Inter prediction methods, and prediction approaches using image information within the same image can also be called as Intra prediction methods.

The second phase is one of coding the error between the predicted block of pixels and the original block of pixels. This may be accomplished by transforming the difference in pixel values using a specified transform. This transform may be e.g. a Discrete Cosine Transform (DCT) or a variant thereof. After transforming the difference, the transformed difference may be quantized and entropy encoded.

By varying the fidelity of the quantization process, the encoder can control the balance between the accuracy of the pixel representation, (in other words, the quality of the picture) and the size of the resulting encoded video representation (in other words, the file size or transmission bit rate).

The decoder reconstructs the output video by applying a prediction mechanism similar to that used by the encoder in order to form a predicted representation of the pixel blocks (using the motion or spatial information created by the encoder and stored in the compressed representation of the image) and prediction error decoding (the inverse operation of the prediction error coding to recover the quantized prediction error signal in the spatial domain).

After applying pixel prediction and error decoding processes the decoder combines the prediction and the prediction error signals (the pixel values) to form the output video frame.

The decoder (and encoder) may also apply additional filtering processes in order to improve the quality of the output video before passing it for display and/or storing as a prediction reference for the forthcoming frames in the video sequence.

In some video codecs, such as High Efficiency Video Coding Working Draft 4, video pictures may be divided into coding units (CU) covering the area of a picture. A coding unit consists of one or more prediction units (PU) defining the prediction process for the samples within the coding unit and one or more transform units (TU) defining the prediction error coding process for the samples in the coding unit. A coding unit may consist of a square block of samples with a size selectable from a predefined set of possible coding unit sizes. A coding unit with the maximum allowed size can be named as a largest coding unit (LCU) and the video picture may be divided into non-overlapping largest coding units. A largest coding unit can further be split into a combination of smaller coding units, e.g. by recursively splitting the largest coding unit and resultant coding units. Each resulting coding unit may have at least one prediction unit and at least one transform unit associated with it. Each prediction unit and transform unit can further be split into smaller prediction units and transform units in order to increase granularity of the prediction and prediction error coding processes, respectively. Each prediction unit may have prediction information associated with it defining what kind of a prediction is to be applied for the pixels within that prediction unit (e.g. motion vector information for inter predicted prediction units and intra prediction directionality information for intra predicted prediction units). Similarly, each transform unit may be associated with information describing the prediction error decoding process for samples within the transform unit (including e.g. discrete cosine transform (DCT) coefficient information). It may be signalled at coding unit level whether prediction error coding is applied or not for each coding unit. In the case there is no prediction error residual associated with the coding unit, it can be considered there are no transform units for the coding unit. The division of the image into coding units, and division of coding units into prediction units and transform units may be signalled in the bitstream allowing the decoder to reproduce the intended structure of these units.

In some video codecs, motion information is indicated by motion vectors associated with each motion compensated image block. These motion vectors represent the displacement of the image block in the picture to be coded (in the encoder) or decoded (at the decoder) and the prediction source block in one of the previously coded or decoded images (or pictures). In order to represent motion vectors efficiently, motion vectors may be coded differentially with respect to block specific predicted motion vector. In some video codecs, the predicted motion vectors are created in a predefined way, for example by calculating the median of the encoded or decoded motion vectors of the adjacent blocks.

Another way to create motion vector predictions is to generate a list or a set of candidate predictions from blocks in the current frame and/or co-located or other blocks in temporal reference pictures and signalling the chosen candidate as the motion vector prediction. A spatial motion vector prediction is a prediction obtained only on the basis of information of one or more blocks of the same frame than the current frame whereas temporal motion vector prediction is a prediction obtained on the basis of information of one or more blocks of a frame different from the current frame. It may also be possible to obtain motion vector predictions by combining both spatial and temporal prediction information of one or more encoded blocks. These kinds of motion vector predictions are called as spatio-temporal motion vector predictions.

In addition to predicting the motion vector values, the reference index in the reference picture list can be predicted. The reference index may be predicted from blocks in the current frame and/or co-located or other blocks in a temporal reference picture. Moreover, some high efficiency video codecs employ an additional motion information coding/decoding mechanism, often called merging/merge mode, where all the motion field information, which includes motion vector and corresponding reference picture index for each available reference picture list, may be predicted and used without any modification or correction. Similarly, predicting the motion field information may be carried out using the motion field information of blocks in the current frame and/or co-located or other blocks in temporal reference pictures and the used motion field information is signalled among a list of motion field candidate list filled with motion field information of available blocks in the current frame and/or co-located or other blocks in temporal reference pictures.

In some video codecs the prediction residual after motion compensation is first transformed with a transform kernel (like DCT) and then coded. The reason for this is that often there still exists some correlation among the residual and transform can in many cases help reduce this correlation and provide more efficient coding.

Some video encoders utilize Lagrangian cost functions to find optimal coding modes, e.g. the desired Macroblock mode and associated motion vectors. This kind of cost function uses a weighting factor λ (lambda) to tie together the (exact or estimated) image distortion due to lossy coding methods and the (exact or estimated) amount of information that is required to represent the pixel values in an image area:

$$C = D + \lambda R \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

SUMMARY

The present invention introduces a method for signaling whether a lossless coding mode is enabled e.g. for a picture or for a coding unit. This may be achieved by inserting in a bitstream an indicator which can be used to determine if a lossless coding method is enabled or not. In some embodiments the indicator is inserted into a bitstream when the lossless coding method is used and the indicator is not included into the bitstream if the lossless coding method is not used.

According to a first aspect of the present invention there is provided a method comprising:
 receiving a set of coefficients;
 receiving indication whether lossless coding mode is applied;
 determining whether a sign of a coefficient in the set of coefficients can be embedded in a bitstream, where determining whether a sign of a coefficient in the set of coefficients can be embedded in a bitstream is dependent at least on the indication of whether lossless coding mode is applied.

According to a second aspect of the present invention there is provided a method comprising:
 receiving a set of encoded coefficients;
 receiving indication whether lossless coding mode is applied;
 determining whether a bitstream contains an indication of an embedded sign of a coefficient, where determining whether a bitstream contains an indication of an embedded sign of a coefficient is dependent at least on the indication of whether lossless coding mode is applied;
 if the determining indicates that the bitstream contains the indication of an embedded sign of a coefficient, determining the sign on the basis of the decoded coefficients; and
 modifying the sign of the coefficient on the basis of the determined sign.

According to a third aspect of the present invention there is provided an apparatus comprising a processor and a memory including computer program code, the memory and the computer program code configured to, with the processor, cause the apparatus to:
 receive a set of coefficients;
 receive indication whether lossless coding mode is applied;
 determine whether a sign of a coefficient in the set of coefficients can be embedded in a bitstream, where determining whether a sign of a coefficient in the set of coefficients can be embedded in a bitstream is dependent at least on the indication of whether lossless coding mode is applied.

According to a fourth aspect of the present invention there is provided an apparatus comprising a processor and a memory including computer program code, the memory and the computer program code configured to, with the processor, cause the apparatus to: receive a set of encoded coefficients;
 receive indication whether lossless coding mode is applied;
 determine whether a bitstream contains an indication of an embedded sign of a coefficient, where
 determining whether a bitstream contains an indication of an embedded sign of a coefficient is dependent at least on the indication of whether lossless coding mode is applied;
 determine the sign on the basis of the decoded coefficients, if the determining indicates that the bitstream contains the indication of an embedded sign of a coefficient; and
 modify the sign of the coefficient on the basis of the determined sign.

According to a fifth aspect of the present invention there is provided a storage medium having stored thereon a computer executable program code for use by an encoder, said program code comprises instructions for:
 receiving a set of coefficients;
 receiving indication whether lossless coding mode is applied;
 determining whether a sign of a coefficient in the set of coefficients can be embedded in a bitstream, where determining whether a sign of a coefficient in the set of coefficients can be embedded in a bitstream is dependent at least on the indication of whether lossless coding mode is applied.

According to a sixth aspect of the present invention there is provided a storage medium having stored thereon a computer executable program code for use by a decoder, said program code comprises instructions for:
 receiving a set of encoded coefficients;
 receiving indication whether lossless coding mode is applied;
 determining whether a bitstream contains an indication of an embedded sign of a coefficient, where determining whether a bitstream contains an indication of an embedded sign of a coefficient is dependent at least on the indication of whether lossless coding mode is applied;

if the determining indicates that the bitstream contains the indication of an embedded sign of a coefficient, determining the sign on the basis of the decoded coefficients; and modifying the sign of the coefficient on the basis of the determined sign.

According to a seventh aspect of the present invention there is provided an apparatus comprising:

means for receiving a set of coefficients;

means for receiving indication whether lossless coding mode is applied;

means for determining whether a sign of a coefficient in the set of coefficients can be embedded in a bitstream, where determining whether a sign of a coefficient in the set of coefficients can be embedded in a bitstream is dependent at least on the indication of whether lossless coding mode is applied.

According to an eighth aspect of the present invention there is provided an apparatus comprising:

means for receiving a set of encoded coefficients;

means for receiving indication whether lossless coding mode is applied;

means for determining whether a bitstream contains an indication of an embedded sign of a coefficient;

means for determining the sign on the basis of the decoded coefficients, if the determining indicates that the bitstream contains the indication of an embedded sign of a coefficient; and means for modifying the sign of the coefficient on the basis of the determined sign.

DESCRIPTION OF THE DRAWINGS

For better understanding of the present invention, reference will now be made by way of example to the accompanying drawings in which.

DETAILED DESCRIPTION OF SOME EXAMPLE EMBODIMENTS

The following describes in further detail suitable apparatus and possible mechanisms for the provision of improving the prediction accuracy and hence possibly reducing information to be transmitted in video coding systems. In this regard reference is first made to FIG. 1 which shows a schematic block diagram of an exemplary apparatus or electronic device 50, which may incorporate a codec according to an embodiment of the invention.

Figure 1:
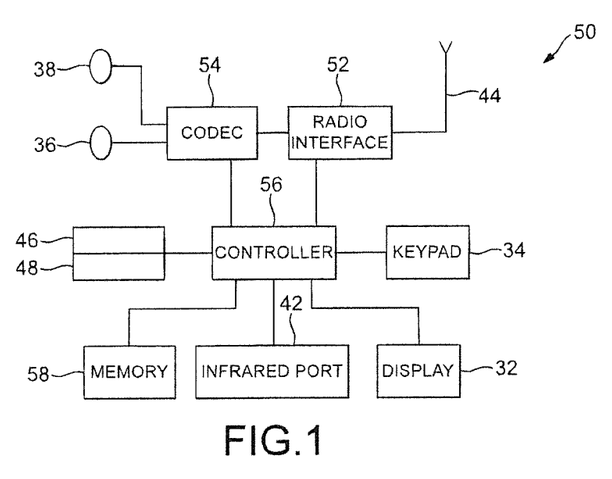
FIG. 1 shows schematically an electronic device employing some embodiments of the invention.
Figure 2:
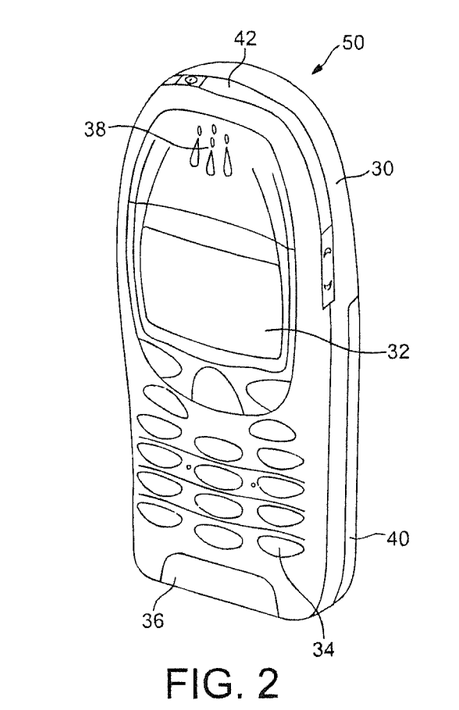
FIG. 2 shows schematically a user equipment suitable for employing some embodiments of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
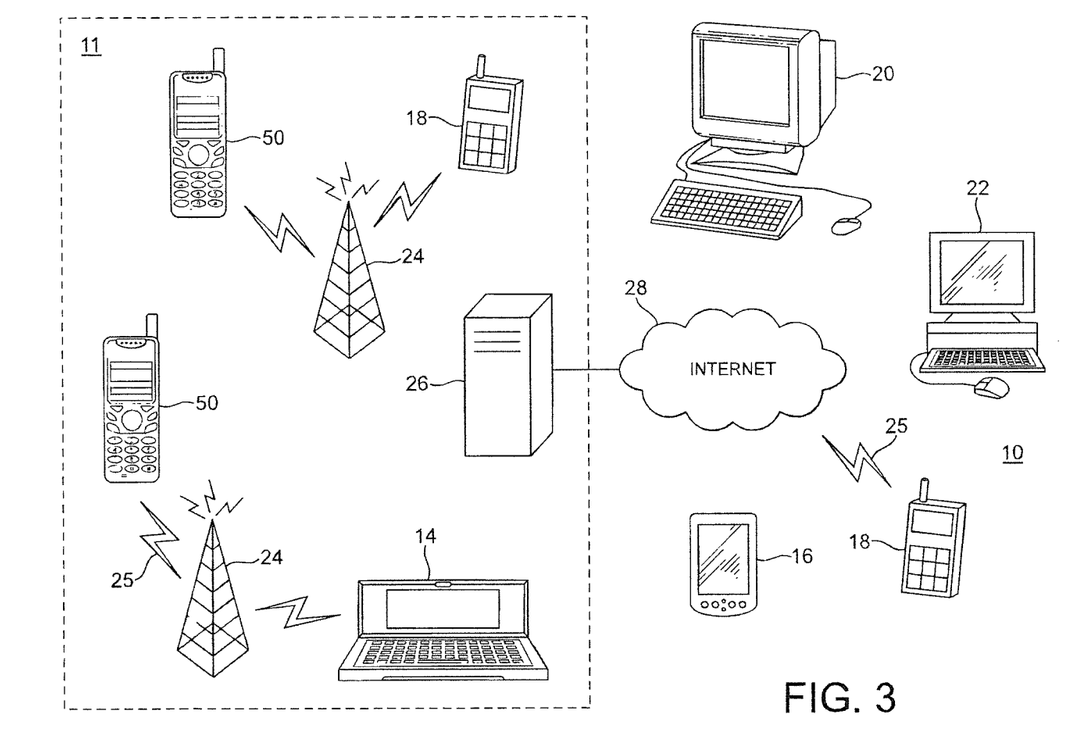
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
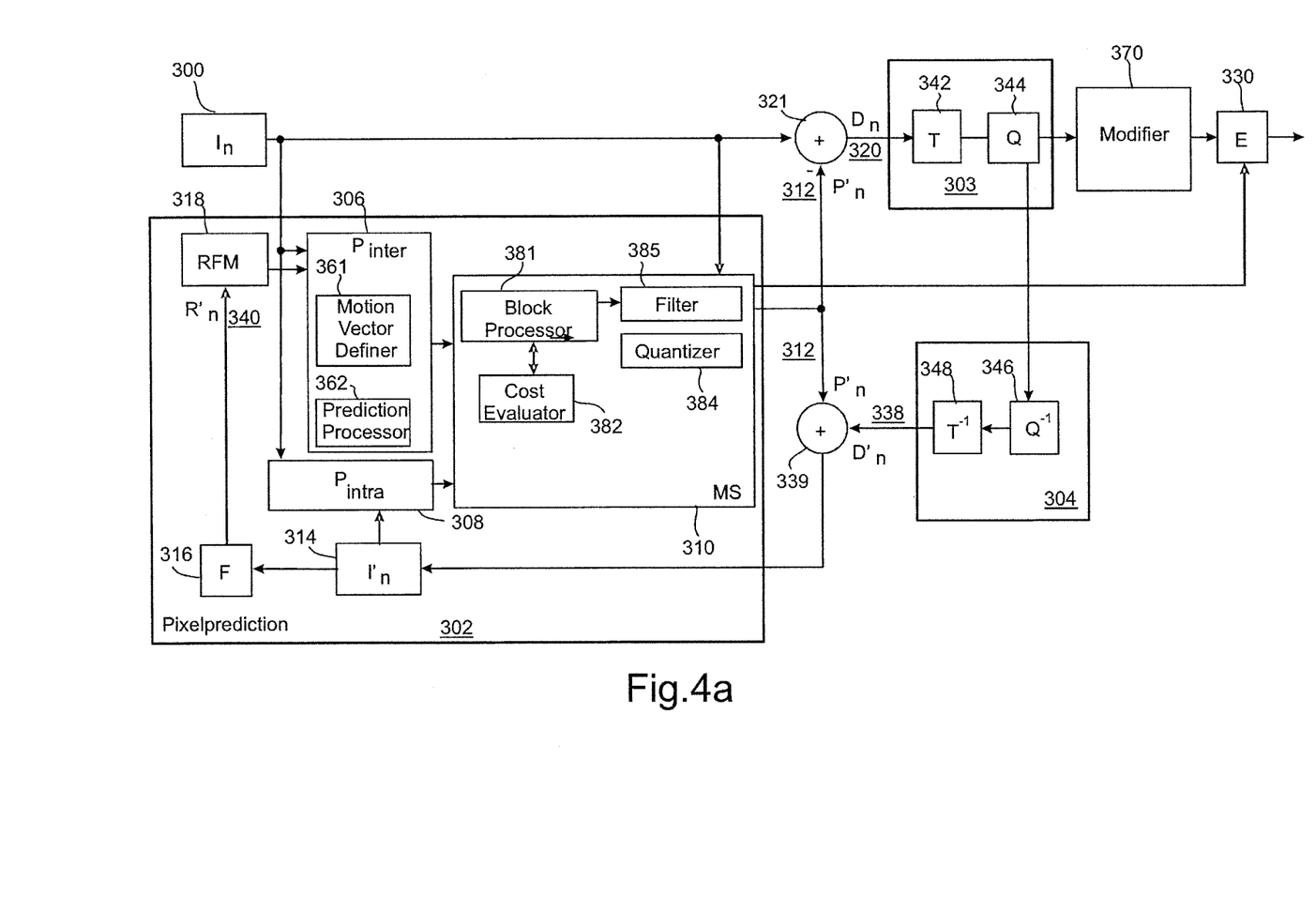
FIG. 4a shows schematically an embodiment of the invention as incorporated within an encoder.
Figure 5:
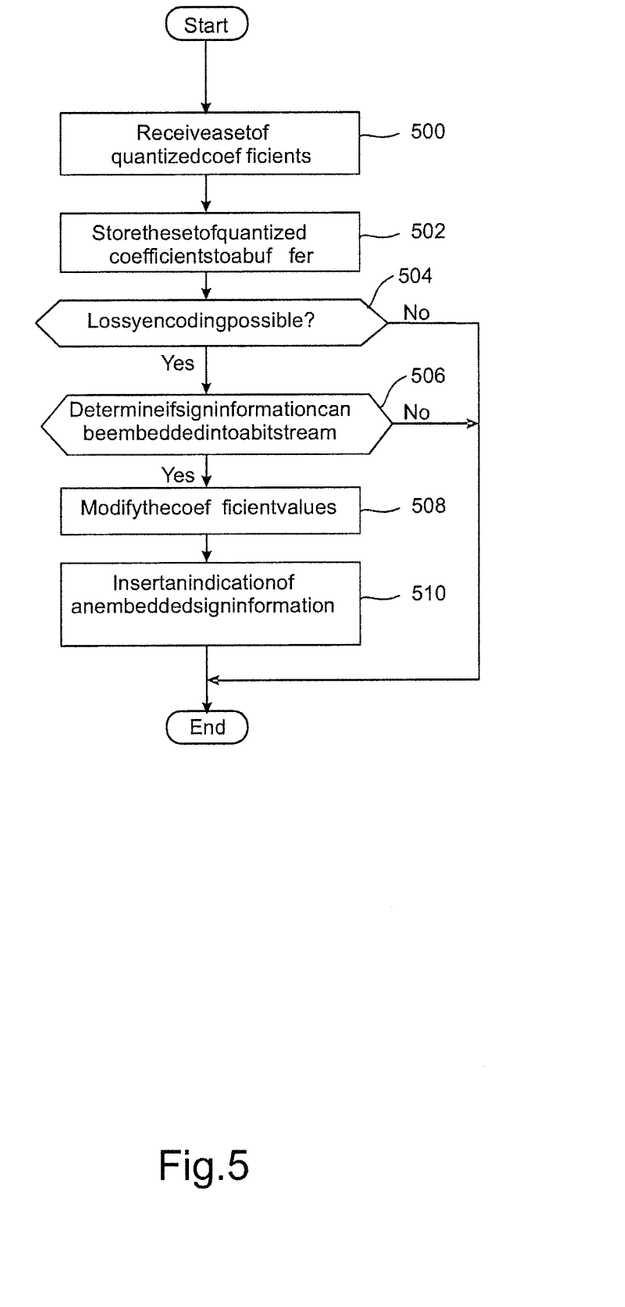
FIG. 5 shows a flow diagram showing the operation of an embodiment of the invention with respect to the encoder as shown in FIGS. 4a and 4b.

With respect to FIG. 4a, a block diagram of a video encoder suitable for carrying out embodiments of the invention is shown. Furthermore, with respect to FIG. 5, the operation of the encoder exemplifying embodiments of the invention specifically with respect to determine whether to insert an indication in the bitstream or not is shown as a flow diagram.

FIG. 4a shows the encoder as comprising a pixel predictor 302, prediction error encoder 303, a modifier 370 and prediction error decoder 304. FIG. 4a also shows an embodiment of the pixel predictor 302 as comprising an inter-predictor 306, an intra-predictor 308, a mode selector 310, a filter 316, and a reference frame memory 318. In this embodiment the mode selector 310 comprises a block processor 381 and a cost evaluator 382. The encoder may further comprise an entropy encoder 330 for entropy encoding the bit stream.

Figure 4B:
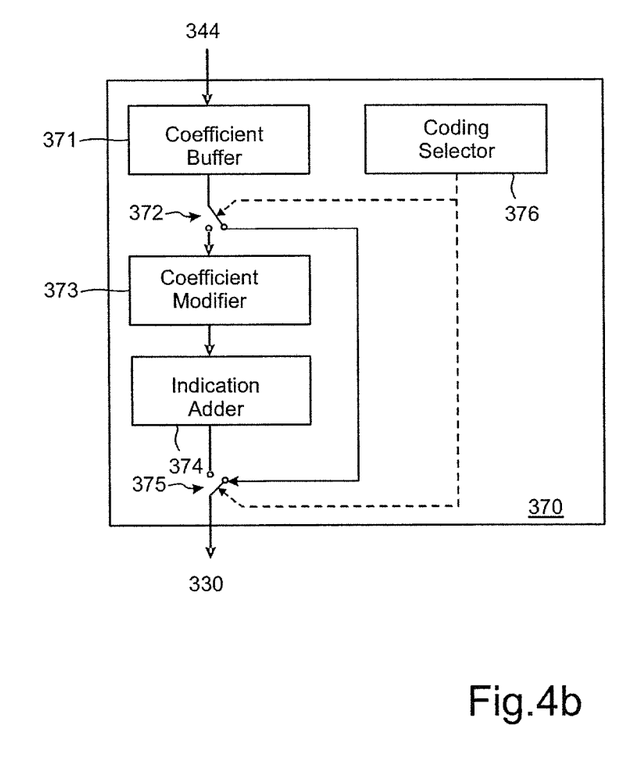
FIG. 4b shows schematically an embodiment of a modifier according to some embodiments of the invention.

FIG. 4b depicts an embodiment of the modifier 370. The modifier 370 may comprise a coefficient buffer 371 for storing (block 502 in FIG. 5) quantized coefficient values received (block 500 in FIG. 5) from a quantizer 344. A coding selector 376 may determine 504 whether the coding is to be performed in a lossless manner or not. If the coding selector 376 selects to use lossless coding, the coding selector 376 may control the modifier to output the quantized coefficient values without modifying them. This is illustrated with a first switch 372 and a second switch 375. It should be noted that the switches 372, 375 need not actually be switches but they only illustrate the possibility to provide the quantized transform coefficients as such or as modified to the output of the modifier. If the coding selector 376 selects to use lossy coding, the coding selector 376 may control the modifier to output the quantized coefficient values to a coefficient modifier 373. The coefficient modifier 373 may then determine 506 if e.g. the sign of the first coefficient can be embedded and if so, embed the sign information in such a way that the decoder may determine the sign from other, already decoded information. This operation may need that one or more of the coefficients are modified 508 so that the decoder shall be able to determine the sign. In some situations modifications to the quantized coefficient values may not be needed wherein the coefficient modifier 373 may provide the quantized coefficients as such to the optional entropy encoder 330. Information of the sign embedding may be provided 510 in the bitstream.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of the current frame or picture). The output of both the inter-predictor and the intra-predictor may be passed to the mode selector 310. The intra-predictor 308 may have more than one intra-prediction modes. Hence, each mode may perform the intra-prediction and provide the predicted signal to the mode selector 310. The mode selector 310 also receives a copy of the image 300.

The mode selector 310 determines which encoding mode to use to encode the current block. If the mode selector 310 decides to use an inter-prediction mode it will pass the output of the inter-predictor 306 to the output of the mode selector 310. If the mode selector 310 decides to use an intra-prediction mode it will pass the output of one of the intra-predictor modes to the output of the mode selector 310.

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations.

The operation of the pixel predictor 302 may be configured to carry out any known pixel prediction algorithm known in the art.

The pixel predictor 302 may also comprise a filter 385 to filter the predicted values before outputting them from the pixel predictor 302.

The operation of the prediction error encoder 302 and prediction error decoder 304 will be described hereafter in further detail. In the following examples the encoder generates images in terms of 16×16 pixel macroblocks which go to form the full image or picture. Thus, for the following examples the pixel predictor 302 outputs a series of predicted macroblocks of size 16×16 pixels and the first summing device 321 outputs a series of 16×16 pixel residual data macroblocks which may represent the difference between a first macro-block in the image 300 against a predicted macro-block (output of pixel predictor 302). It would be appreciated that other size macro blocks may be used.

The prediction error encoder 303 comprises a transform block 342 and a quantizer 344. The transform block 342 transforms the first prediction error signal 320 to a transform domain. The transform is, for example, the DCT transform. The quantizer 344 quantizes the transform domain signal, e.g. the DCT coefficients, to form quantized coefficients.

The prediction error decoder 304 receives the output from the prediction error encoder 303 and performs the opposite processes of the prediction error encoder 303 to produce a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal and an inverse transformation block 348, which performs the inverse transformation to the reconstructed transform signal wherein the output of the inverse transformation block 348 contains reconstructed block(s). The prediction error decoder may also comprise a macroblock filter (not shown) which may filter the reconstructed macroblock according to further decoded information and filter parameters.

In the following an example embodiment of embedding the sign information (e.g. a sign bit) will be described. The coding selector 364 may select to encode the sign information or to embed the sign information. As was mentioned above, the selection may be based on whether a lossless encoding is to be performed or a lossy encoding is allowed. If the sign is to be encoded without embedding, the sign bit for all the coefficients may be provided by the encoder. If the embedding of the sign is selected, the coefficient modifier may search the first non-zero coefficient from the quantized coefficient values in a scanning order and determine the sign of the coefficient. In an example embodiment the sign may be compared to the sum of the quantized coefficients values and if the parity of the sum is the same than the sign, coefficients may be transmitted without modifications. If the sign and the parity are not the same, one or more of the quantized coefficients may be modified so that the parity matches the sign. The modification may be performed e.g. by changing a value of one or more of the coefficients.

If the sign information has been embedded in the bitstream the indication adder 363 may add a syntax element or other indication to the bitstream so that a decoder can detect that the sign of the first coefficient is not transmitted as such but has been embedded in the bitstream. Alternatively, the decoder can detect if the sign bit of a coefficient is embedded by analysing the number of non-zero coefficients in the transform unit.

Figure 6:
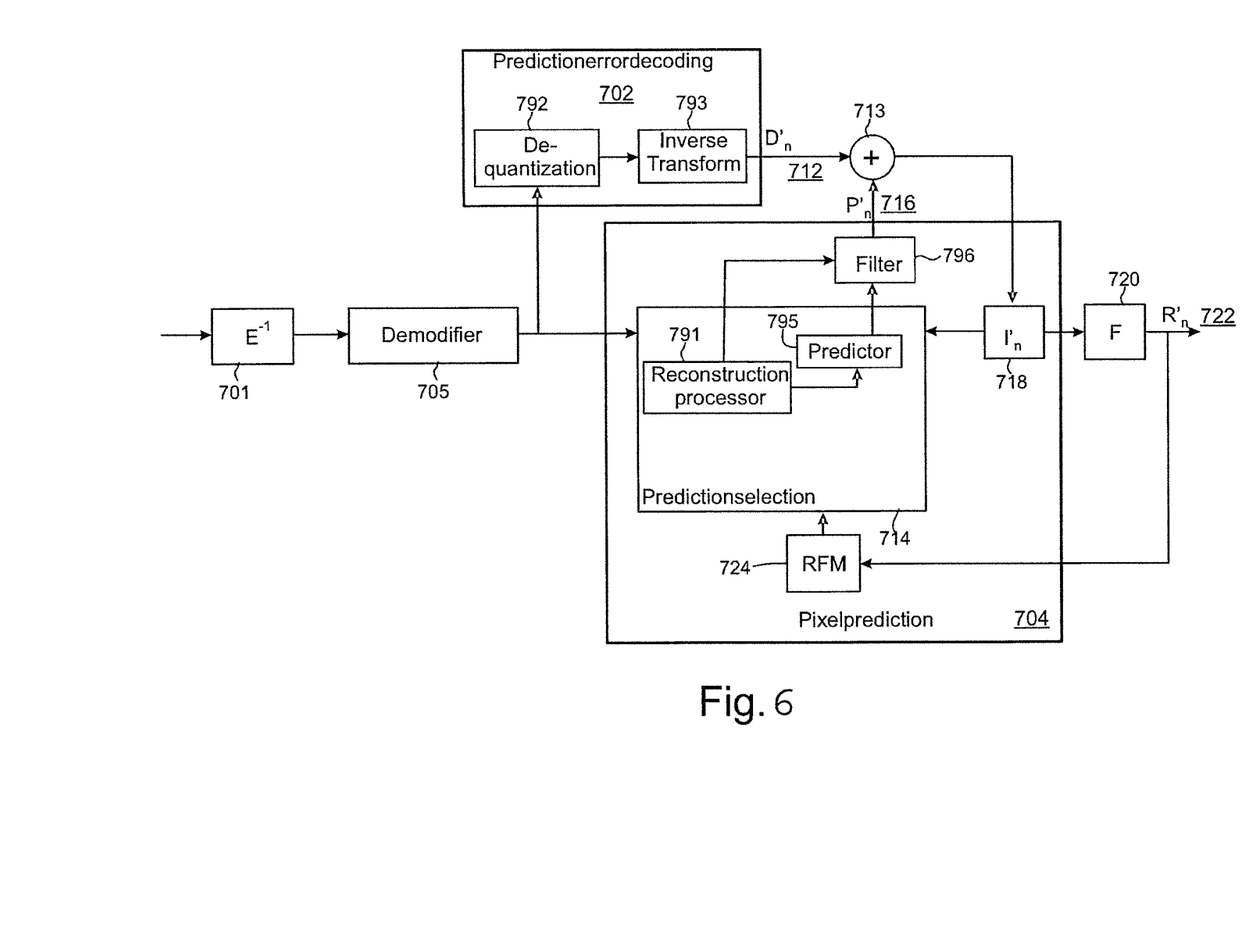
FIG. 6 shows schematically an embodiment of the invention as incorporated within a decoder.

In the following the operation of an example embodiment of the decoder 600 is depicted in more detail with reference to FIG. 6.

Figure 7:
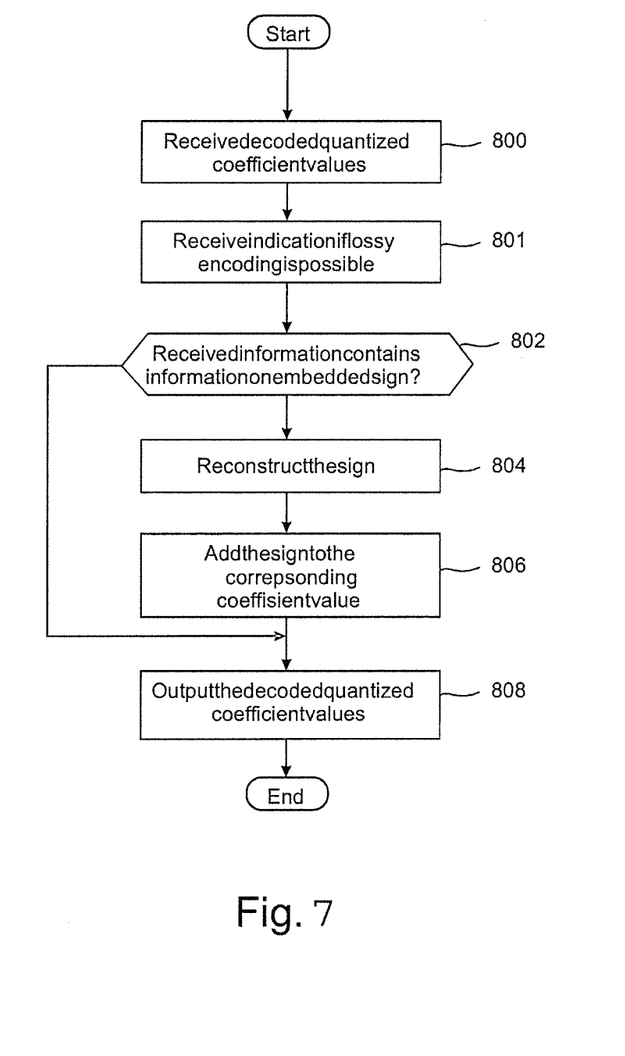
FIG. 7 shows a flow diagram of showing the operation of an embodiment of the invention with respect to the decoder shown in FIG. 6.

At the decoder side similar operations are performed to reconstruct the image blocks. FIG. 6 shows a block diagram of a video decoder 700 suitable for employing embodiments of the invention and FIG. 7 shows a flow diagram of an example of a method in the video decoder. The bitstream to be decoded may be received from the encoder, from a network element, from a storage medium or from another source. The decoder is aware of the structure of the bitstream so that it can determine the meaning of the entropy coded codewords and may decode the bitstream by an entropy decoder 701 which performs entropy decoding on the received signal. The entropy decoder thus performs the inverse operation to the entropy encoder 330 of the encoder described above. The entropy decoder 701 outputs the results of the entropy decoding to a demodifier 705 (block 800 in FIG. 7). The demodifier 705 may examine 802 the received bitstream to determine whether it contains an indication of an embedded sign information. As was mentioned above, this determination may be based on an indication in the bitstream whether a lossless coding is performed. This indication may be received 801 by the decoder and the demodifier 705 may examine the received indication. If the bitstream contains an indication of an embedded sign information, the demodifier 705 reconstructs 804 the sign information from the decoded, quantized coefficient values and adds 806 the sign to the quantized coefficient of which sign information was embedded into the bitstream. The demodifier 705 outputs the reconstructed quantized coefficient values to a prediction error decoder 702 and a pixel predictor 704.

In some embodiments the entropy coding may not be used but another channel encoding may be in use, or the encoded bitstream may be provided to the decoder 700 without channel encoding. The decoder 700 may comprise a corresponding channel decoder to obtain the encoded codewords from the received signal.

The pixel predictor 704 receives the output of the entropy decoder 701. The output of the entropy decoder 701 may include an indication on the prediction mode used in encoding the current block. A predictor selector 714 within the pixel predictor 704 determines that an intra-prediction or an inter-prediction is to be carried out. The predictor selector 714 may furthermore output a predicted representation of an image block 716 to a first combiner 713. The predicted representation of the image block 716 is used in conjunction with the reconstructed prediction error signal 712 to generate a preliminary reconstructed image 718. The preliminary reconstructed image 718 may be used in the predictor 714 or may be passed to a filter 720. The filter 720, if used, applies a filtering which outputs a final reconstructed signal 722. The final reconstructed signal 722 may be stored in a reference frame memory 724, the reference frame memory 724 further being connected to the predictor 714 for prediction operations.

Also the prediction error decoder 702 receives the output of the entropy decoder 701. A dequantizer 792 of the prediction error decoder 702 may dequantize the output of the entropy decoder 701 and the inverse transform block 793 may perform an inverse transform operation to the dequantized signal output by the dequantizer 792. The output of the entropy decoder 701 may also indicate that prediction error signal is not to be applied and in this case the prediction error decoder produces an all zero output signal.

The decoder selects the 16×16 pixel residual macroblock to reconstruct. This residual macroblock is also called as a current block.

The decoder may receive information on the encoding mode used in encoding of the current block. The indication is decoded, when necessary, and provided to the reconstruction processor 791 of the prediction selector 714. The reconstruction processor 791 examines the indication and selects one of the intra-prediction mode(s), if the indication indicates that the block has been encoded using intra-prediction, or the inter-prediction mode, if the indication indicates that the block has been encoded using inter-prediction.

For inter-prediction mode the reconstruction processor 791 may comprise one or more elements corresponding to the prediction processor 362 of the encoder, such as a motion vector definer, a prediction list modifier and/or a motion vector selector.

In example embodiments, syntax structures, semantics of syntax elements, and decoding process may be specified as follows. Syntax elements in the bitstream are represented in bold type. Each syntax element is described by its name (all lower case letters with underscore characters), optionally its one or two syntax categories, and one or two descriptors for its method of coded representation. The decoding process behaves according to the value of the syntax element and to the values of previously decoded syntax elements. When a value of a syntax element is used in the syntax tables or the text, it appears in regular (i.e., not bold) type. In some cases the syntax tables may use the values of other variables derived from syntax elements values. Such variables appear in the syntax tables, or text, named by a mixture of lower case and upper case letter and without any underscore characters. Variables starting with an upper case letter are derived for the decoding of the current syntax structure and all depending syntax structures. Variables starting with an upper case letter may be used in the decoding process for later syntax structures without mentioning the originating syntax structure of the variable. Variables starting with a lower case letter are only used within the context in which they are derived. In some cases, "mnemonic" names for syntax element values or variable values are used interchangeably with their numerical values. Sometimes "mnemonic" names are used without any associated numerical values. The association of values and names is specified in the text. The names are constructed from one or more groups of letters separated by an underscore character. Each group starts with an upper case letter and may contain more upper case letters.

In example embodiments, common notation for arithmetic operators, logical operators, relational operators, bit-wise operators, assignment operators, and range notation e.g. as specified in H.264/AVC or a draft HEVC may be used. Furthermore, common mathematical functions e.g. as specified in H.264/AVC or a draft HEVC may be used and a common order of precedence and execution order (from left to right or from right to left) of operators e.g. as specified in H.264/AVC or a draft HEVC may be used.

In example embodiments, the following descriptor may be used to specify the parsing process of each syntax element.
  ae(v): a context-adaptive arithmetic entropy-coded syntax
    element.

In example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

In the following an example embodiment of the residual coding syntax is described.

| | Descriptor |
|---|---|
| residual_coding_cabac( x0, y0, log2TrafoWidth, log2TrafoHeight, scanIdx, cIdx ) { | |
|     last_significant_coeff_x_prefix | ae(v) |
|     last_significant_coeff_y_prefix | ae(v) |
|     if ( last_significant_coeff_x_prefix > 3 ) | |
|         last_significant_coeff_x_suffix | ae(v) |
|     if ( last_significant_coeff_y_prefix > 3 ) | |
|         last_significant_coeff_y_suffix | ae(v) |
|     numCoeff = 0 | |
|     do { | |
|         xC = ScanOrder[ log2TrafoWidth ][ log2TrafoHeight ][ scanIdx ][ numCoeff ][ 0 ] | |
|         yC = ScanOrder[ log2TrafoWidth ][ log2TrafoHeight ][ scanIdx ][ numCoeff ][ 1 ] | |
|         numCoeff++ | |
|     } while( ( xC != LastSignificantCoeffX ) \|\| ( yC != LastSignificantCoeffY ) ) | |
|     numLastSubset = (numCoeff – 1) >> 4 | |
|     for( i = numLastSubset; i >= 0; i– – ) { | |
|         offset = i << 4 | |
|         if( max( log2TrafoWidth, log2TrafoHeight ) > 3) { | |
|             xCG = ScanOrder[ log2TrafoWidth – 2 ][ log2TrafoHeight – 2 ][ scanIdx ][ i ][ 0 ] | |
|             yCG = ScanOrder[ log2TrafoWidth – 2 ][ log2TrafoHeight – 2 ][ scanIdx ][ i ][ 1 ] | |
|             rightCGFlag = (xCG = = (1<< (log2TrafoWidth – 2)) – 1) ? 0 : | |
|                       significant_coeff_group_flag[ xCG + 1 ][ yCG ] | |
|             bottomCGFlag = (yCG = = (1 << (log2TrafoHeight – 2)) – 1) ? 0 : | |
|                       significant_coeff_group_flag[ xCG ][ yCG + 1 ] | |
|             if( (i = = numLastSubset) \|\| (rightCGFlag + bottomCGFlag = = 2) \|\| (i = = 0) ) | |
|                 significant_coeff_group_flag[ xCG ][ yCG ] = 1 | |
|             else | |
|                 significant_coeff_group_flag[ xCG ][ yCG ] | ae(v) |

-continued

| residual_coding_cabac( x0, y0, log2TrafoWidth, log2TrafoHeight, scanIdx, cIdx ) { | Descriptor |
|---|---|
|       for(n = 15; n >= 0; n− − ) { | |
|         xC = ScanOrder[ log2TrafoWidth ][ log2TrafoHeight ][ scanIdx ][ n + offset ][ 0 ] | |
|         yC = ScanOrder[ log2TrafoWidth ][ log2TrafoHeight ][ scanIdx ][ n + offset ][ 1 ] | |
|         if ( ( n + offset) < (numCoeff − 1) && significant_coeff_group_flag[ xCG ][ yCG ] ) { | |
|           numNZInCG = (i = = numLastSubset) ? 1 : 0 | |
|           if ( ( n > 0) | | (rightCGFlag + bottomCGFlag = = 2) | | (i = = 0) | | (numNZInCG > 0) ) { | |
|             significant_coeff_flag[ xC ][ yC ] | ae(v) |
|             numNZInCG += significant_coeff_flag[ xC ][ yC ] | |
|           else | |
|             significant_coeff_flag[ xC ][ yC ] = 1 | |
|           if (sign_data_hiding && significant_coeff_flag[xC][yC] && !lossless_coding_enabled) { | |
|             dhFirstX = xC | |
|             dhFirstY = yC | |
|             dhFirstIdx = n+offset | |
|           } | |
|         } | |
|       } | |
|       } else { | |
|         for( n = 15; n >= 0; n− − ) { | |
|           xC = ScanOrder[ log2TrafoWidth ][ log2TrafoHeight ][ scanIdx ][ n + offset ][ 0 ] | |
|           yC = ScanOrder[ log2TrafoWidth ][ log2TrafoHeight ][ scanIdx ][ n + offset ][ 1 ] | |
|           if( (n + offset) < (numCoeff − 1) ) | |
|             significant_coeff_flag[ xC ][ yC ] | ae(v) |
|           if (sign_data_hiding && significant_coeff_flag[xC][yC] && !lossless_coding_enabled) { | |
|             dhFirstX = xC | |
|             dhFirstY = yC | |
|             dhFirstIdx = n+offset | |
|           } | |
|         } | |
|       } | |
|       for( n = 15; n >= 0; n− − ) { | |
|         xC = ScanOrder[ log2TrafoWidth ][ log2TrafoHeight ][ scanIdx ][ n + offset ][ 0 ] | |
|         yC = ScanOrder[ log2TrafoWidth ][ log2TrafoHeight ][ scanIdx ][ n + offset ][ 1 ] | |
|         if( significant_coeff_flag[ xC ][ yC ] ) | |
|           coeff_abs_level_greater1_flag[ n ] | ae(v) |
|       } | |
|       for( n = 15; n >= 0; n− − ) { | |
|         if( coeff_abs_level_greater1_flag[ n ] ) | |
|           coeff_abs_level_greater2_flag[ n ] | ae(v) |
|       } | |
|       for( n = 15; n >= 0; n− − ) { | |
|         if( coeff_abs_level_greater2_flag[ n ] ) | |
|           coeff_abs_level_minus3[n] | ae(v) |
|         xC = ScanOrder[ log2TrafoWidth ][ log2TrafoHeight ][ scanIdx ][ n + offset ][ 0 ] | |
|         yC = ScanOrder[ log2TrafoWidth ][ log2TrafoHeight ][ scanIdx ][ n + offset ][ 1 ] | |
|         if( significant_coeff_flag[ xC ][ yC ] ) { | |
|           transCoeffLevel[ x0 ][ y0 ][ cIdx ][ xC ][ yC ] = | |
|             ( coeff_abs_level_minus3[ n ] + 3 ) | |
|           if (sign_data_hiding && !lossless_coding_enabled) | |
|             sumAbs += coeff_abs_level_minus3[n]+3 | |
|         } else | |
|           transCoeffLevel[ x0 ][ y0 ][ cIdx ][ xC ][ yC ] = 0 | |
|       } | |
|     } | |
|     if (sign_data_hiding && !lossless_coding_enabled) | |
|       signHidden = numCoeff-dhFirstIdx+1 >= tsig | |
|     for( n = numCoeff − 1; n >= 0; n− − ) { | |
|       xC = ScanOrder[ log2TrafoSize − 2 ][ log2TrafoSize − 2 ][ scanIdx ][ n ][ 0 ] | |
|       yC = ScanOrder[ log2TrafoSize − 2 ][ log2TrafoSize − 2 ][ scanIdx ][ n ][ 1 ] | |
|       if( significant_coeff_flag[ xC ][ yC ] ) { | |
|         if (!sign_data_hiding \|\| !signHidden \|\| xC != dhFirstX \|\| yC != dhFirstY \|\| lossless_coding_enabled) | |
|           coeff_sign_flag[ n ] | |
|         Else | |
|           coeff_sign_flag[n] = sumAbs%2 | |
|         if( coeff_sign_flag[n] ) | |
|           transCoeffLevel[x0][y0][trafoDepth][cIdx][dhFirstIdx] *= −1 | |
|       } | |
|     } | |
| } | |

The parameter lossless_coding_enabled specifies if lossless coding mode is enabled for the current transform unit.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

In some embodiments there is provided a method comprising:

receiving a set of coefficients;

receiving indication whether lossless coding mode is applied;

determining whether a sign of a coefficient in the set of coefficients can be embedded in a bitstream, where determining whether a sign of a coefficient in the set of coefficients can be embedded in a bitstream is dependent at least on the indication of whether lossless coding mode is applied.

In some embodiments of the method, if the determining indicates that the sign of the coefficient in the set of coefficients can be embedded in the bitstream, inserting an indication of the embedded sign bit.

In some embodiments the determining comprises analysing the number of non-zero coefficients in a transform unit.

In some embodiments the determining comprises searching the first non-zero coefficient from the quantized coefficient values in a scanning order and determining the sign of the coefficient.

In some embodiments the sign is compared with a sum of the quantized coefficient values.

In some embodiments the method comprises determining whether the parity of the sum is the same than the sign; and if not so, modifying at least one coefficient.

In some embodiments the method comprises embedding the sign into the bitstream, if the indication indicates that lossless coding mode is not applied.

In some embodiments there is provided a method comprising:

receiving a set of encoded coefficients;

receiving indication whether lossless coding mode is applied;

determining whether a bitstream contains an indication of an embedded sign of a coefficient;

if the determining indicates that the bitstream contains the indication of an embedded sign of a coefficient, determining the sign on the basis of the decoded coefficients; and modifying the sign of the coefficient on the basis of the determined sign.

In some embodiments the determining the sign comprises analysing the number of non-zero coefficients in a transform unit.

In some embodiments the method comprises reconstructing the sign from the bitstream on the basis of the determined number of non-zero coefficients in the transform unit.

In some embodiments there is provided an apparatus comprising a processor and a memory including computer program code, the memory and the computer program code configured to, with the processor, cause the apparatus to:
receive a set of coefficients;
receive indication whether lossless coding mode is applied;
determine whether a sign of a coefficient in the set of coefficients can be embedded in a bitstream, where determining whether a sign of a coefficient in the set of coefficients can be embedded in a bitstream is dependent at least on the indication of whether lossless coding mode is applied.

In some embodiments an indication of the embedded sign bit is inserted, if the determining indicates that the sign of the coefficient in the set of coefficients can be embedded in the bitstream.

In some embodiments the apparatus comprises computer program code configured to, with the processor, cause the apparatus to analyse the number of non-zero coefficients in a transform unit.

In some embodiments the apparatus comprises computer program code configured to, with the processor, cause the apparatus to search the first non-zero coefficient from the quantized coefficient values in a scanning order and to determine the sign of the coefficient.

In some embodiments the apparatus comprises computer program code configured to, with the processor, cause the apparatus to compare the sign with a sum of the quantized coefficient values.

In some embodiments the apparatus comprises computer program code configured to, with the processor, cause the apparatus to determine whether the parity of the sum is the same than the sign; and if not so, to modify at least one coefficient.

In some embodiments the apparatus comprises computer program code configured to, with the processor, cause the apparatus to examine if the set of coefficients can be encoded with a lossy encoding method, and if so, embedding the sign into the bitstream.

In some embodiments there is provided an apparatus comprising a processor and a memory including computer program code, the memory and the computer program code configured to, with the processor, cause the apparatus to:
receive a set of encoded coefficients;
receive indication whether lossless coding mode is applied;
determine whether a bitstream contains an indication of an embedded sign of a coefficient, where determining whether a bitstream contains an indication of an embedded sign of a coefficient is dependent at least on the indication of whether lossless coding mode is applied;
determine the sign on the basis of the decoded coefficients, if the determining indicates that the bitstream contains the indication of an embedded sign of a coefficient; and
modify the sign of the coefficient on the basis of the determined sign.

In some embodiments the apparatus comprises computer program code configured to, with the processor, cause the apparatus to
determine the number of coefficients between a first and a last non-zero coefficient in the set of coefficients.

In some embodiments the apparatus comprises computer program code configured to, with the processor, cause the apparatus to reconstruct the sign from the bitstream on the basis of the determined number of coefficients and the values of the coefficients.

In some embodiments there is provided a storage medium having stored thereon a computer program code a computer executable program code for use by an encoder, said program codes comprise instructions for use by an encoder, said program code comprises instructions for:
receiving a set of coefficients;
receiving indication whether lossless coding mode is applied;
determining whether a sign of a coefficient in the set of coefficients can be embedded in a bitstream, where determining whether a sign of a coefficient in the set of coefficients can be embedded in a bitstream is dependent at least on the indication of whether lossless coding mode is applied.

In some embodiments said program code comprises instructions for inserting an indication of the embedded sign bit, if the determining indicates that the sign of the coefficient in the set of coefficients can be embedded in the bitstream.

In some embodiments there is provided a storage medium having stored thereon a computer program code a computer executable program code for use by an encoder, said program codes comprise instructions for use by an encoder, said program code comprises instructions for:
receiving a set of encoded coefficients;
receiving indication whether lossless coding mode is applied;
determining whether a bitstream contains an indication of an embedded sign of a coefficient, where determining whether a bitstream contains an indication of an embedded sign of a coefficient is dependent at least on the indication of whether lossless coding mode is applied;
if the determining indicates that the bitstream contains the indication of an embedded sign of a coefficient, determining the sign on the basis of the decoded coefficients; and
modifying the sign of the coefficient on the basis of the determined sign.

In some embodiments there is provided an apparatus comprising:
means for receiving a set of coefficients;
means for receiving indication whether lossless coding mode is applied;
means for determining whether a sign of a coefficient in the set of coefficients can be embedded in a bitstream, where determining whether a sign of a coefficient in the set of coefficients can be embedded in a bitstream is dependent at least on the indication of whether lossless coding mode is applied.

In some embodiments the apparatus comprises means for inserting an indication of the embedded sign bit, if the determining indicates that the sign of the coefficient in the set of coefficients can be embedded in the bitstream.

In some embodiments there is provided an apparatus comprising:
means for receiving a set of encoded coefficients;
means for determining whether a bitstream contains an indication of an embedded sign of a coefficient;
means for determining the sign on the basis of the decoded coefficients, if the determining indicates that the bitstream contains the indication of an embedded sign of a coefficient; and
means for modifying the sign of the coefficient on the basis of the determined sign.

The invention claimed is:
1. A method comprising:
receiving a set of coefficients;
receiving indication whether lossless coding mode is applied;

determining whether a sign of a coefficient in the set of coefficients can be embedded in a bitstream, wherein the embedded sign of a coefficient is determinable based on already encoded information in the bit stream, and the determining whether a sign of a coefficient in the set of coefficients can be embedded in a bitstream is dependent at least on the indication of whether lossless coding mode is applied;

embedding the sign into the bit stream, in response to the indication indicating that the lossless coding mode is not applied; and encoding the sign into the bitstream, in response to the indication indicating that lossless coding is applied.

2. The method according to claim 1 further comprising inserting an indication of the embedded sign bit, if the determining indicates that the sign of the coefficient in the set of coefficients can be embedded in the bitstream.

3. The method according to claim 1, the determining comprising analysing the number of non-zero coefficients in a transform unit.

4. The method according to claim 1, the determining comprising searching the first non-zero coefficient from the quantized coefficient values in a scanning order and determining the sign of the coefficient.

5. The method according to claim 1 further comprising comparing the sign with a sum of the quantized coefficient values.

6. The method according to claim 1 further comprising determining whether the parity of the sum is the same than the sign; and if not so, modifying at least one coefficient.

7. A method comprising:
receiving a set of encoded coefficients;
receiving indication whether lossless coding mode is applied;
determining whether a bitstream contains an indication of an embedded sign of a coefficient, wherein the embedded sign of a coefficient is determinable based on already encoded information in the bit stream;
if the determining indicates that the bitstream contains the indication of an embedded sign of a coefficient, determining the sign on the basis of the decoded coefficients by analysing the number of non-zero coefficients in a transform unit; and
modifying the sign of the coefficient on the basis of the determined sign.

8. The method according to claim 7 further comprising reconstructing the sign from the bitstream on the basis of the determined number of non-zero coefficients in the transform unit.

9. An apparatus comprising a processor and a memory including computer program code stored thereon, the memory and the computer program code configured to, with the processor, cause the apparatus to:
receive a set of coefficients;
receive indication whether lossless coding mode is applied;
determine whether a sign of a coefficient in the set of coefficients can be embedded in a bitstream, wherein the embedded sign of a coefficient is determinable based on already encoded information in the bit stream, and determining whether a sign of a coefficient in the set of coefficients can be embedded in a bitstream is dependent at least on the indication of whether lossless coding mode is applied;
embedding the sign into the bit stream, in response to the indication indicating that the lossless coding mode is not applied; and
encoding the sign into the bitstream, in response to the indication indicating that lossless coding is applied.

10. The apparatus according to claim 9 comprising computer program code configured to, with the processor, cause the apparatus to insert an indication of the embedded sign bit, if the determining indicates that the sign of the coefficient in the set of coefficients can be embedded in the bitstream.

11. The apparatus according to claim 9 comprising computer program code configured to, with the processor, cause the apparatus to analyse the number of non-zero coefficients in a transform unit.

12. The apparatus according to claim 9 comprising computer program code configured to, with the processor, cause the apparatus to search the first non-zero coefficient from the quantized coefficient values in a scanning order and to determine the sign of the coefficient.

13. The apparatus according to claim 9 comprising computer program code configured to, with the processor, cause the apparatus to compare the sign with a sum of the quantized coefficient values.

14. An apparatus comprising a processor and a memory including computer program code stored thereon, the memory and the computer program code configured to, with the processor, cause the apparatus to:
receive a set of encoded coefficients;
receive indication whether lossless coding mode is applied;
determine whether a bitstream contains an indication of an embedded sign of a coefficient, wherein the embedded sign of a coefficient is determinable based on already encoded information in the bit stream, where determining whether a bitstream contains an indication of an embedded sign of a coefficient is dependent at least on the indication of whether lossless coding mode is applied;
determine the sign on the basis of the decoded coefficients by analysing the number of non-zero coefficients in a transform unit, if the determining indicates that the bitstream contains the indication of an embedded sign of a coefficient; and
modify the sign of the coefficient on the basis of the determined sign.

15. A non-transitory storage medium having stored thereon a computer program code comprising instructions for use by an encoder, said program code comprises instructions for:
receiving a set of coefficients;
receiving indication whether lossless coding mode is applied;
determining whether a sign of a coefficient in the set of coefficients can be embedded in a bitstream, wherein the embedded sign of a coefficient is determinable based on already encoded information in the bit stream, and determining whether a sign of a coefficient in the set of coefficients can be embedded in a bitstream is dependent at least on the indication of whether lossless coding mode is applied;
embedding the sign into the bit stream, in response to the indication indicating that the lossless coding mode is not applied; and
encoding the sign into the bitstream, in response to the indication indicating that lossless coding is applied.

16. A non-transitory storage medium having stored thereon a computer program code comprising instructions for use by an encoder, said program code comprises instructions for:
receiving a set of encoded coefficients;
receiving indication whether lossless coding mode is applied;

determining whether a bitstream contains an indication of an embedded sign of a coefficient, wherein the embedded sign of a coefficient is determinable based on already encoded information in the bit stream, where determining whether a bitstream contains an indication of an embedded sign of a coefficient is dependent at least on the indication of whether lossless coding mode is applied;

if the determining indicates that the bitstream contains the indication of an embedded sign of a coefficient, determining the sign on the basis of the decoded coefficients by analysing the number of non-zero coefficients in a transform unit; and modifying the sign of the coefficient on the basis of the determined sign.

17. An apparatus comprising:

means for receiving a set of coefficients;

means for receiving indication whether lossless coding mode is applied;

means for determining whether a sign of a coefficient in the set of coefficients can be embedded in a bitstream, wherein the embedded sign of a coefficient is determinable based on already encoded information in the bit stream, and determining whether a sign of a coefficient in the set of coefficients can be embedded in a bitstream is dependent at least on the indication of whether lossless coding mode is applied;

embedding the sign into the bit stream, in response to the indication indicating that the lossless coding mode is not applied; and encoding the sign into the bitstream, in response to the indication indicating that lossless coding is applied.

18. An apparatus comprising:

means for receiving a set of encoded coefficients;

means for determining whether a bitstream contains an indication of an embedded sign of a coefficient;

means for determining the sign on the basis of the decoded coefficients by analysing the number of non-zero coefficients in a transform unit, if the determining indicates that the bitstream contains the indication of an embedded sign of a coefficient, wherein the embedded sign of a coefficient is determinable based on already encoded information in the bit stream; and means for modifying the sign of the coefficient on the basis of the determined sign.

* * * * *